United States Patent [19]

Takahashi

[11] Patent Number: 5,022,705
[45] Date of Patent: Jun. 11, 1991

[54] LID GUIDE STRUCTURE FOR SUN ROOF DEVICE

[75] Inventor: Jun Takahashi, Yokohama, Japan

[73] Assignee: Ohi Seisakusho Co., Ltd., Yokohama, Japan

[21] Appl. No.: 420,096

[22] Filed: Oct. 11, 1989

[30] Foreign Application Priority Data

Oct. 11, 1988 [JP] Japan .................. 63-131821[U]
Dec. 12, 1988 [JP] Japan .................. 63-160356[U]

[51] Int. Cl.⁵ .............................................. B60J 7/00
[52] U.S. Cl. ............................... 296/213; 296/216
[58] Field of Search .................... 296/213, 216, 223

[56] References Cited

U.S. PATENT DOCUMENTS 4,272,123 6/1981 Mori ........................ 296/223 X
4,709,959 12/1987 Paerisch et al. ................ 296/217

FOREIGN PATENT DOCUMENTS

58-218423 12/1983 Japan .
60-6621 1/1985 Japan .
0034815 2/1987 Japan ............................ 296/213
0215421 9/1988 Japan ............................ 296/223
385814 1/1933 United Kingdom ............ 296/223

Primary Examiner—Dennis H. Pedder
Attorney, Agent, or Firm—Foley & Lardner

[57] ABSTRACT

Disclosed herein is a lid guide structure for a sun roof device. The lid guide structure comprises a first elongate member, and second and third elongate members extending in parallel from longitudinal ends of the first elongate member. Each of the second and third elongate members includes a longitudinally extending gutter portion which is defined between outboard and inboard walls. Mutually facing surfaces of the outboard and inboard walls are each formed at a major flat part thereof with a longitudinally extending channel leaving a longitudinally extending ridge at the upper end of each wall. Each of the longitudinally extending channels is defined by two inclined surfaces, one surface close to the longitudinally extending ridge and one remote from the ridge.

15 Claims, 6 Drawing Sheets

LID GUIDE STRUCTURE FOR SUN ROOF DEVICE

BACKGROUND OF THE INVENTION

1. Field of the Invention

The present invention relates in general to a sun roof device for a motor vehicle, and more particularly, to a lid guide structure employed in the sun roof device.

2. Description of the Prior Art

In order to clarify the task of the present invention, one conventional lid guide structure for a sun roof device disclosed in Japanese Patent First Provisional Publication No. 58-218423 will be described with reference to FIGS. 9 and 10 of the accompanying drawings.

Figure 9:
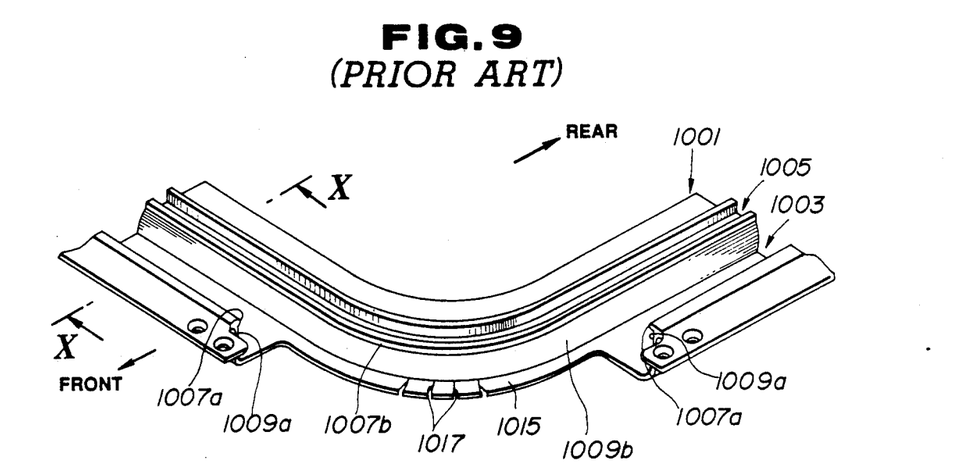
FIG. 9 is a view similar to FIG. 3, but showing a conventional lid guide structure.

Referring to FIG. 9, there is shown one corner portion of the lid guide structure 1001. The guide structure 1001 comprises a rainwater gutter portion 1003 which extends along the periphery of the guide structure 1001, and a guide rail portion 1005 which extends in parallel with the gutter portion 1003, as shown.

Figure 10:
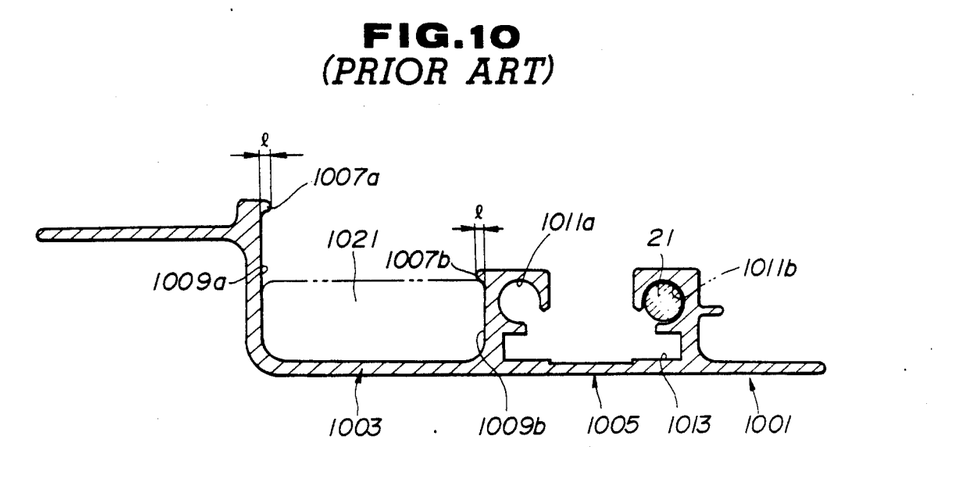
FIG. 10 is a sectional view taken along the line X—X of FIG. 9.

As is seen from FIG. 10, outboard and inboard walls 1009a and 1009b of the gutter portion 1003 have respectively longitudinally extending water stoppers 1007a and 1007b projected toward each other by a given small distance "l". Due to provision of the stoppers 1007a and 1007b, rainwater in the gutter portion 1003 is prevented from running out over the walls 1009a and 1009b even when the vehicle on which the lid guide structure 1001 is mounted is subjected to a severe toss.

The guide rail portion 1005 includes paired side walls one of which serves also as the inboard wall 1009b of the gutter portion 1003. These paired side walls define therebetween a guide rail groove 1013 and respectively have longitudinally extending cylindrical grooves 1011a and 1011b formed therein. The cylindrical grooves 1011a and 1011b have driving cables 21 longitudinally slidably received therein.

However, due to its inherent construction, the above-mentioned lid guide structure 1001 has the followinwg drawbacks.

That is, as is seen from FIG. 9, the lid guide structure 1001 is shaped to have a corner portion for matching with a rectangular sun roof opening of the vehicle roof to which the guide structure 1001 is connected. However, due to the widened construction caused by the parallel arrangement of the rainwater gutter portion 1003 and the guide rail portion 1005, it is very difficult to provide the lid guide structure 1001 with a neatly curved corner portion by bending the same. Thus, hitherto, a measure has been employed in which, for facilitating the bending, an outboard part of the structure 1001 at the area which is to be bent is partially cut out by a stamping machine. After the bending, a plastic corner piece (not shown) is connected to the cut portion to reform the guide structure 1001, more specifically, the rainwater gutter portion 1003.

However, as is seen from FIG. 9, the bending has sometimes caused formation of many cracks 1017 at a remaining bottom wall 1015 of the rainwater gutter portion 1003. Of course, these cracks make the external appearance of the guide structure 1001 poor.

In addition to the above drawback, the following drawback is further possessed by the lid guide structure 1001.

That is, in order to prevent an inward inclination of the outboard wall 1009a of the rainwater gutter portion 1003 upon bending of the structure 1001, an elastomeric elongate spacer 1021 (see FIG. 10) must be closely put in the gutter portion 1003. However, because of provision of the inwardly projected water stoppers 1007a and 1007b, the elastomeric elongate spacer has to be inserted into the gutter portion 1003 awkwardly from one terminal end of the gutter portion 1003, not from the open top of the gutter portion 1003. Furthermore, after the bending, it becomes necessary to remove the spacer from the gutter portion 1003 through the terminal end. These works for handling the spacer are very troublesome. In fact, the removal of the spacer from the gutter portion 1003 is quite difficult because under such condition the spacer is considerably compressed by the outboard and inboarad walls 1009a and 1009b as a result of the bending.

SUMMARY OF THE INVENTION

It is therefore an object of the present invention to provide a lid guide structure for a sun roof device, which is free of the above-mentioned drawbacks.

According to the present invention, there is provided a lid guide structure for a sun roof device, which comprises a first elongate member; a second elongate member extending in a given direction from one end of the first elongate member; a third elongate member extending in the given direction from the other end of the first elongate member, wherein each of the second and third elongate members includes a longitudinally extending gutter portion which is defined between outboard and inboard walls, wherein mutually facing surfaces of the outboard and inboard walls are each formed at a major part thereof with a longitudinally extending channel leaving a longitudinally extending ridge at the upper end of each wall, and wherein each of the facing surfaces has no portions which are projected inwardly beyond an imaginary plane which includes the major part of the facing surface.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
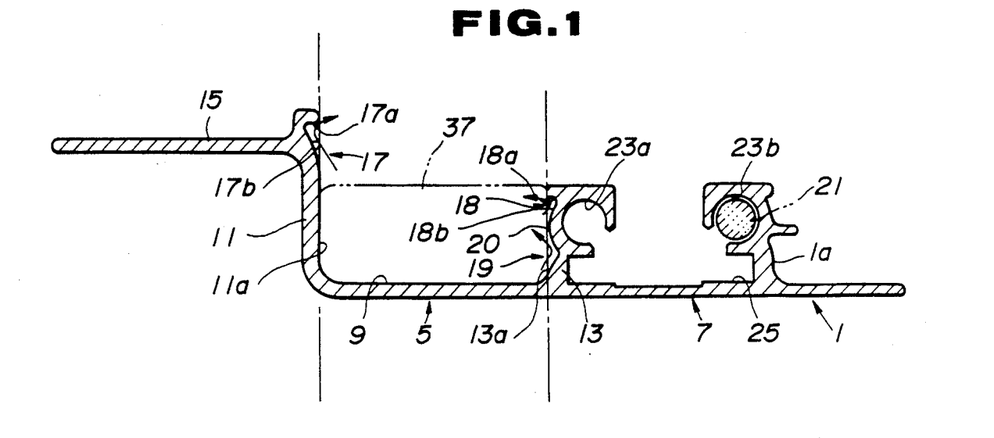
FIG. 1 is a partial sectional view of a lid guide structure of a first embodiment of the present invention, which view is taken along the line I—I of FIG. 2.
Figure 2:
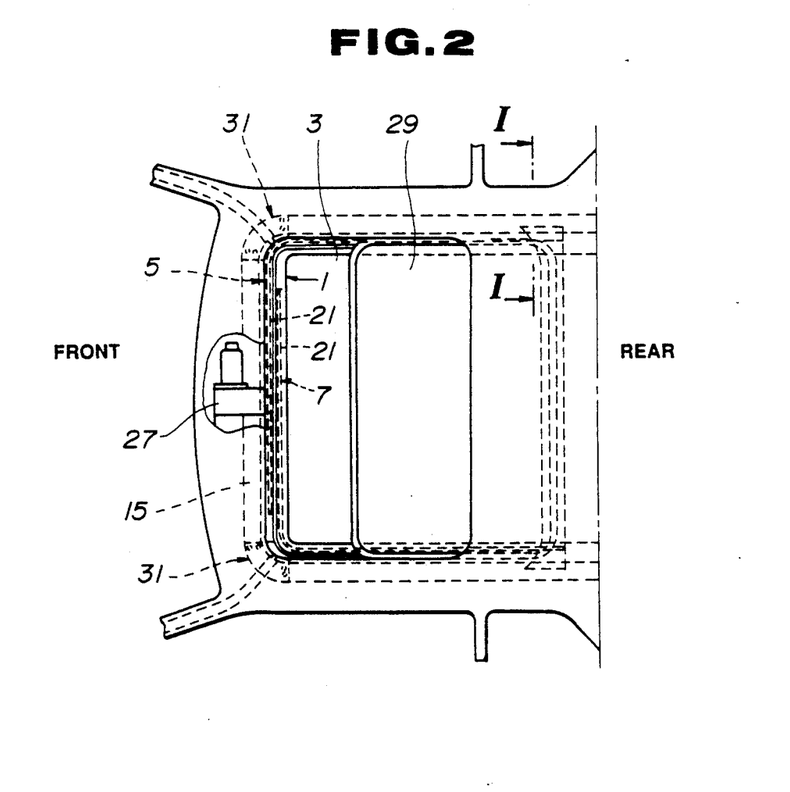
FIG. 2 is a plan view of a sun roof device mounted on a motor vehicle, to which the lid guide structure of the first embodiment is applied.
Figure 3:
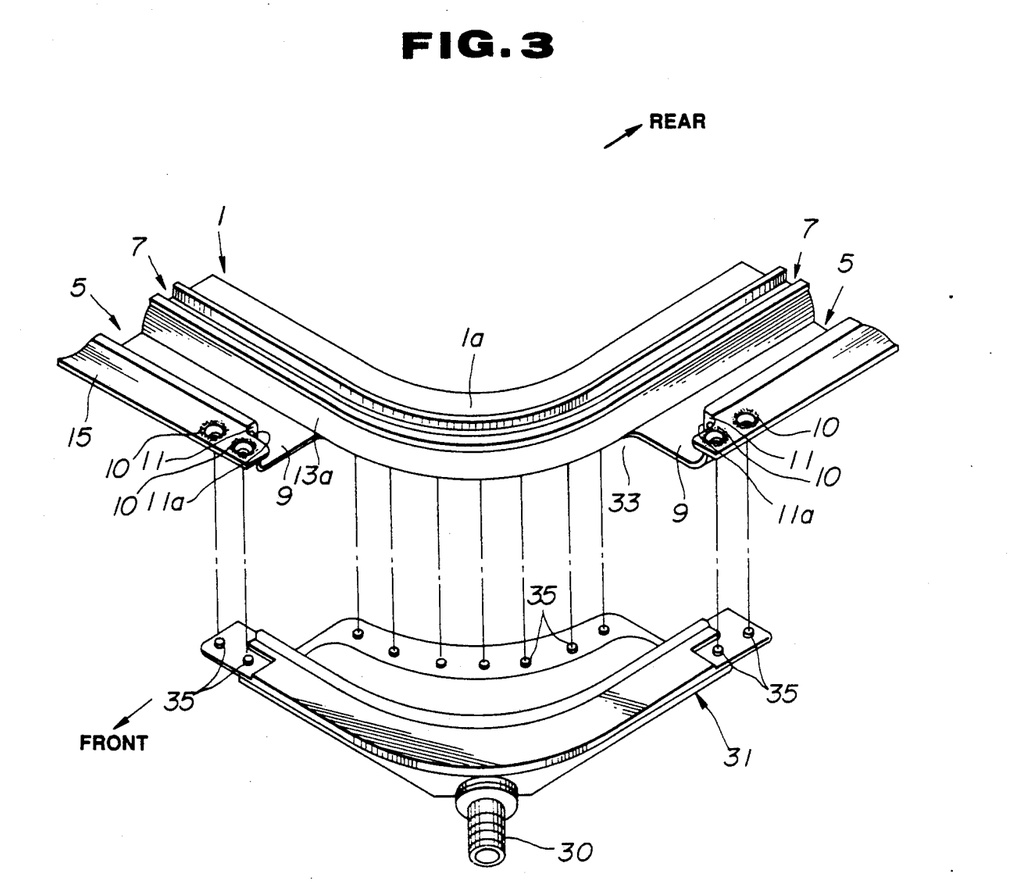
FIG. 3 is a perspective view of an essential part of the lid guide structure of the first embodiment.

Referring to FIGS. 1 to 3, there is shown a lid guide structure of a first embodiment of the present invention.

In the drawings, denoted by numeral 1 is the lid guide structure which is arranged to extend along a peripheral portion of a rectangular sun roof opening 3 (see FIG. 2). That is, as will be understood from FIG. 2, the lid guide structure 1 has a generally U-shaped construction, which includes a front elongate part extending along a front straight periphery of the sun roof opening 3, and opposed side elongate parts extending along respective side straight peripheries of the sun roof opening 3.

For producing the lid guide structure 1, an aluminium plate is drawn, by a known drawing machine, to form an elongate member. Then, the elongate member is set in a stamping machine to partially cut the member at two portions which are to be bent by a subsequent bending process. The member thus partially cut is then set in a bending machine to be bent at the partially cut two portions thereby to form the generally U-shaped construction matching with the rectangular shape of the sun roof opening 3 of the vehicle roof.

Thus, as is seen from FIG. 3, the lid guide structure 1 has two corner portions (only one is shown) whose outside parts have respective cuts 33.

As is seen from FIG. 3, similar to the aforementioned conventional lid guide structure 1001 of FIGS. 9 and 10, the lid guide structure 1 of this first embodiment comprises a rainwater gutter portion 5 which extends along the periphery of a base portion 1a (see FIG. 1) of the guide structure 1, and a guide rail portion 7 which extends in parallel with the gutter portion 5.

As is understood from FIG. 1, the rainwater gutter portion 5 comprises a bottom wall 9 and outboard and inboard walls 11 and 13 raised from the bottom wall 9. A horizontal flange 15 extends outwardly from the outboard wall 11.

An inboard surface 11a of the outboard wall 11 is formed at an upper portion thereof with a first longitudinally extending channel 17 which includes an upper surface 17a and a lower surface 17b. For the purpose which will be clarified hereinafter, an angle defined between a major part of the upper surface 17a and a major part of the inboard surface 11a of the outboard wall 11 is much greater than that defined between a major part of the lower surface 17b and the major part of the inboard surface 11a. Thus, the channel 17 has its deepest portion near the upper surface 17a. It is to be noted that the inboard surface 11a has no portions projected inwardly beyond an imaginary plane "A" which includes the major part of the inboard surface 11a.

An outboard surface 13a of the inboard wall 13 of the rainwater gutter portion 5 is also formed at its upper portion with a second longitudinally extending channel 18 which is similar in construction to the above-mentioned first channel 17. Upper and lower surfaces which define the second channel 18 are denoted by numerals 18a and 18b, respectively. The inboard wall 13 further has below the second channel 18 a third channel 19 which extends along the second channel 18 and includes upper and lower surfaces 19a and 19b. Thus, there is remained a ridge 20 between the second and third channels 18 and 19. It is to be noted that the outboard surface of the inboard wall 13 has no portions projected toward the outboard wall 11 beyond an imaginary plane "B" which includes the major part of the outboard surface 13a.

The guide rail portion 7 includes paired side walls one of which serves also as the inbaord wall 13 of the gutter portion 5. These paired side walls define therebetween a guide rail groove 25 and respectively have longitudinally extending cylindrical grooves 23a and 23b formed therein. The cylindrical grooves 23a and 23b have driving cables 21 longitudinally slidably received therein.

As is seen from FIG. 2, an electric motor 27 of reversible type is mounted on a front portion of the vehicle roof, which drives the driving cables 21 in forward and rearward directions.

As will be understood in the part of an after-mentioned second embodiment, two idential units of a lid operating mechanism are associated with the respective guide rail grooves 25 of the opposed side elongate parts of the lid guide structure 1. The two units of the lid operating mechanism support thereon a sun roof lid 29. Each unit is operatively connected to one of the driving cables 21, so that upon energization of the electric motor 27, each unit is moved forward or rearward in and along the associated guide rail groove 25 thereby moving the lid forward or rearward.

As is seen from FIG. 3, each cut 33 is covered by a plastic corner piece 31 which is secured to the lid guide structure 1. The corner piece 31 has a gutter portion formed thereon. When secured to the lid guide structure 1, the piece 31 connectes its gutter portion to the rainwater gutter portion 5 thereby to complete the gutter portion 5. Denoted by numeral 30 is a draining pipe which is secured to the plastic corner piece, whose interiour is led to the gutter portion of the corner piece 31. For securing the plastic corner piece 31 to the lig guidestructure 1, the piece 31 has been formed with a plurality of studs 35. These studs 35 are received in corresponding openings formed in the lid guide structure 1, and then the leading ends of the studs 35 are caulked 10 for achieving the securing of the corner piece 31 to the structure 1.

In the following, advantages of the first embodiment will be described, which are not expected from the afore-mentioned conventional lid guide structure 1001 of FIGS. 9 and 10.

Similar to the case of the conventional lid guide structure 1001, before bending the elongate guide structure 1, an elastomeric elongate spacer 37 (see FIG. 1) is closely put in the rainwater gutter portion 5 for the purpose of preventing the undesirable inward inclination of the outboard wall 11 of the gutter portion 5. It is however to be noted that, in the first embodiment of the invention, putting and removing the spacer 37 into and from the rainwater gutter portion 5 can be easily carried out because of the flat construction of the mutually facing surfaces 11a and 13a of the outboard and inboard walls 11 and 13.

Since the cut 33 provided by the stamping machine has no portion which corresponds to the remaining bottom wall 1015 of the conventional lid guide structure 1001, such unsightly cracks 1017 (see FIG. 9), which would appear at the remaining bottom all 1015 in the conventional structure 1001, are not produced.

As will be seen from FIG. 1, since, in the rainwater gutter portion 5, the upper surfaces 17a and 18a of the longitudinally extending grooves 17 and 18 serve as water stoppers, rainwater in the gutter portion 5 is prevented from running out over the outboard and inboard walls 11 and 13 or at least minimized.

Referring to FIGS. 4 to 8, there is shown a lid guide structure of a second embodiment of the present invention.

In the drawings, denoted by numeral 51 is the lid guide structure which is arranged to extend along a peripheral portion of a rectangular sun roof opening 55 (see FIG. 8) of a vehicle roof 53. That is, similar to the afore-mentioned first embodiment 1, the lid guide structure 51 of the second embodiment has a generally U-shaped structure. However, the structure 51 of this second embodiment comprises generally three major separate members, which are a first elongate aluminium member 57 extending along a front straight periphery of the sun roof opening 55, and second and third elongate aluminium members 59 and 59 (only one is shown) extending along respective side straight peripheries of the sun roof opening 55. As will be described in detail hereinafter, the second and third members 59 and 59 are secured at their front ends to both ends of the first member 57. Each member 57, 59 or 59 is produced by way of a known drawing technique.

Figure 4:
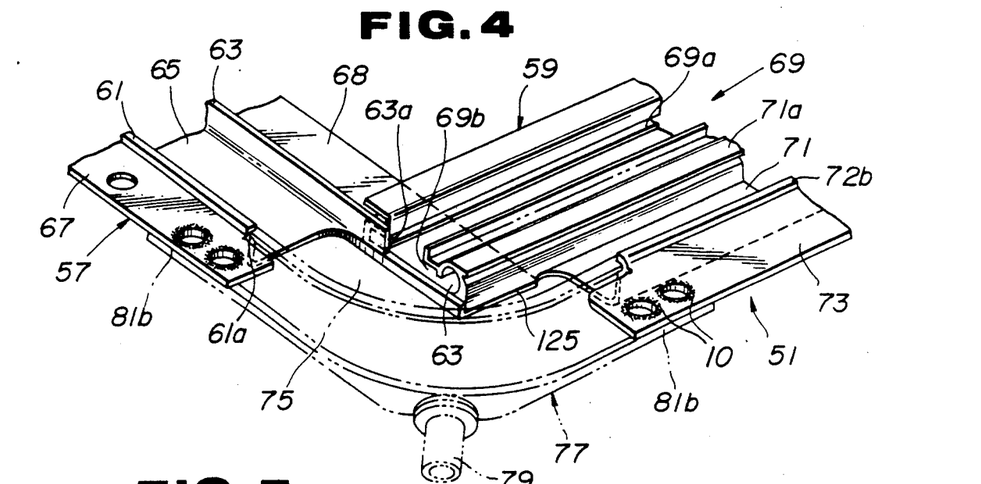
FIG. 4 is a view similar to FIG. 3, but showing a lid guide structure of a second embodiment of the present invention.

As is best seen from FIG. 4, the first elongate member 57 comprises a rainwater gutter portion 65 which is defined between front and rear walls 61 and 63, a front flange 67 extending forward from the front wall 61 and a rear flange 68 extending rearward from the rear wall 63. The front wall 61 is formed at its inboard surface with a longitudinally extending channel 61a which serves as the rainwater stopper mentioned in the first embodiment. The front flange 67 is used for securing the lid guide structure 51 to the front peripheral portion of the sun roof opening 55. That is, as is seen from FIG. 8, the front flange 67 is secured to a roof inner panel 53a.

The second and third elongate members 59 and 59 are constructed symmetrical with each other.

Each of the second and third elongate members 59 and 59 comprises a guide rail portion 69 and a rainwater gutter portion 71 which extends in parallel with the guide rail portion 69, and an outside flange 73 extending outwardly from an outboard wall of the rainwater gutter portion 71. The guide rail portion 69 has two longitudinally extending guide grooves 69a and 69b. The rainwater gutter portion 71 is defined between inboard and outboard walls 71a and 71b each having a longitudinally extending channel (no numeral) which serves as the water stopper. The flange 73 is secured to the roof inner panel 53a.

Each of the second and third elongate members 59 and 59 has a bottom wall whose front part is placed on and secured, by a suitable adhesive material 125, to the rear flange 68 of the first elongate member 57. It is to be noted that the rear wall 63 of the first elongate member 57 has a cut 63a at the portion against which the guide rail portion 69 abuts. If desired, the securing of the second or third elongate member 59 to the front elongate member 57 may be achieved by bolts or the like.

A plastic corner piece 77 is secured to the junction portion between each of the second and third elongate members 59 and 59 and the front elongate member 57. The corner piece 77 is formed with a gutter portion 75 through which the gutter portion 65 of the first member 57 and the gutter portion 71 of the second or third member 59 is communicated. The gutter portion 65 is defined by a curved raised wall 75a formed in the corner piece 77, as is understood from FIG. 5.

Figure 5:
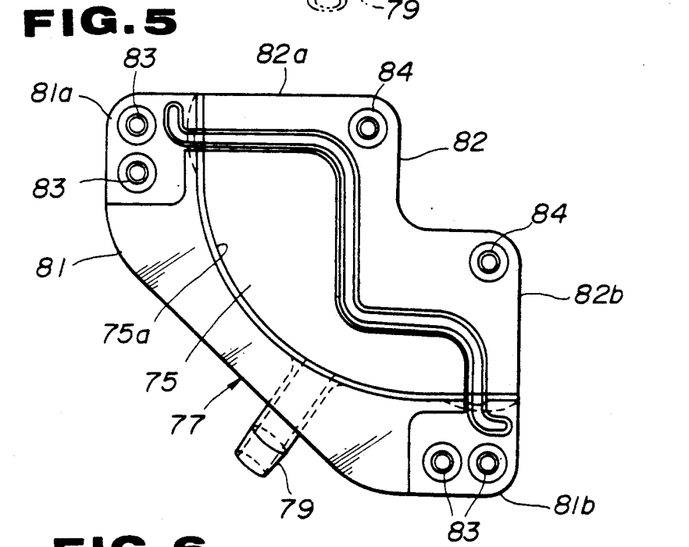
FIG. 5 is a plan view of a plastic corner piece employed in the second embodiment.
Figure 6:
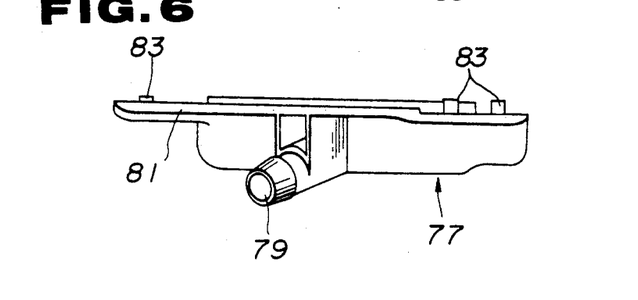
FIG. 6 is a side view of the corner piece.

The corner piece 77 has a drain pipe 79 which is communicated with the gutter portion 75.

The corner piece 77 has further an outside flange 81 whose ends 81a and 81b (see FIG. 4) are respectively secured (see FIG. 5) to the front flange 67 of the first elongate member 57 and the outside flange 73 of the second or third elongate member 59, and has an inside flange 82 whose ends 82a and 82b are respectively secured to the rear flange 68 of the first elongate member 57 and the bottom wall of the guide rail portion 69 of the second or third elongate member 59. For this securing, the plastic corner piece 77 is formed with a plurality of studs 83 and 84 which are received and caulked in corresponding openings formed in the first, second and third elongate members 57, 59 and 59.

Figure 7:
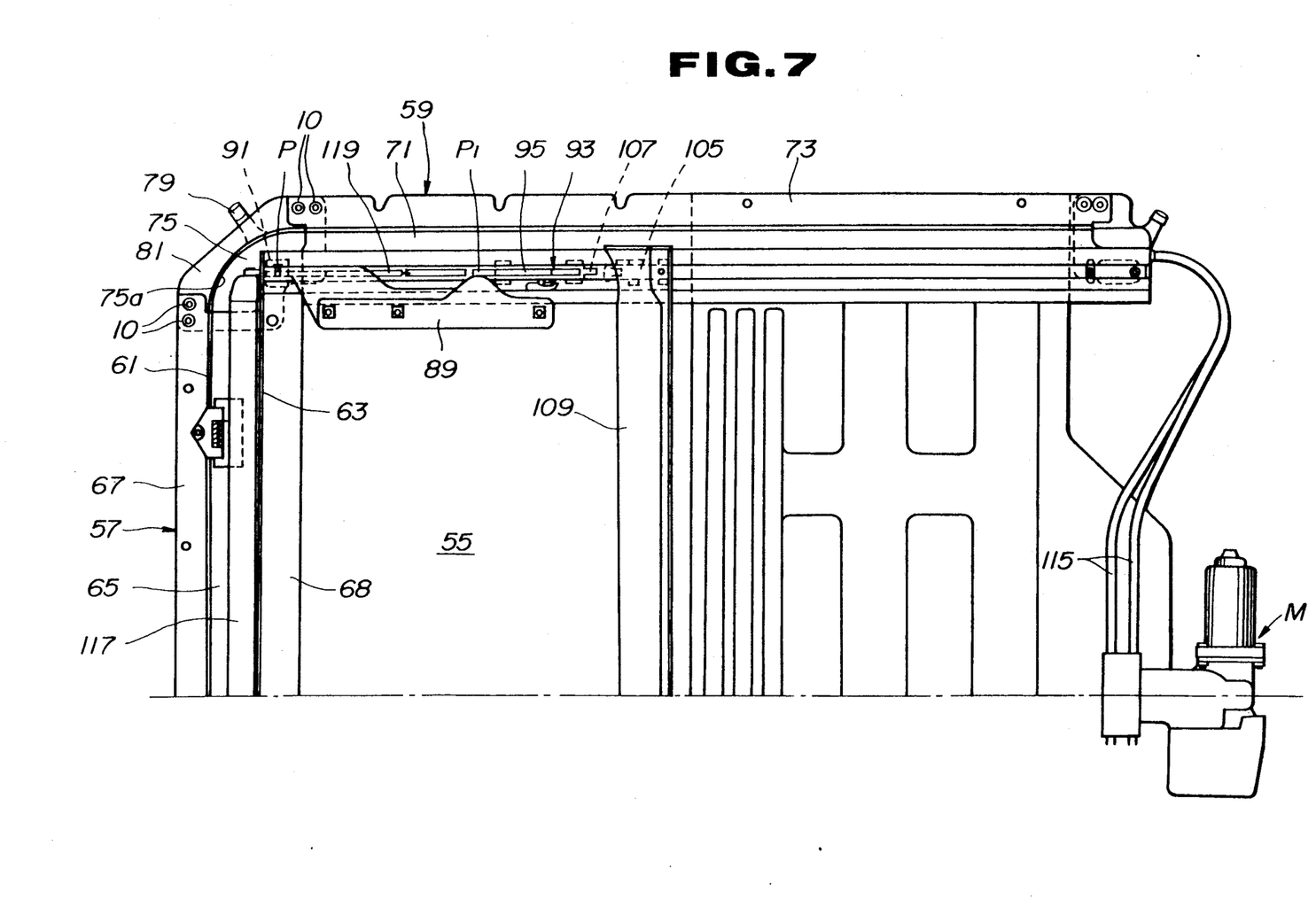
FIG. 7 is a plan, but half, view of a sun roof device to which the lid guide structure of the second embodiment is applied.
Figure 8:
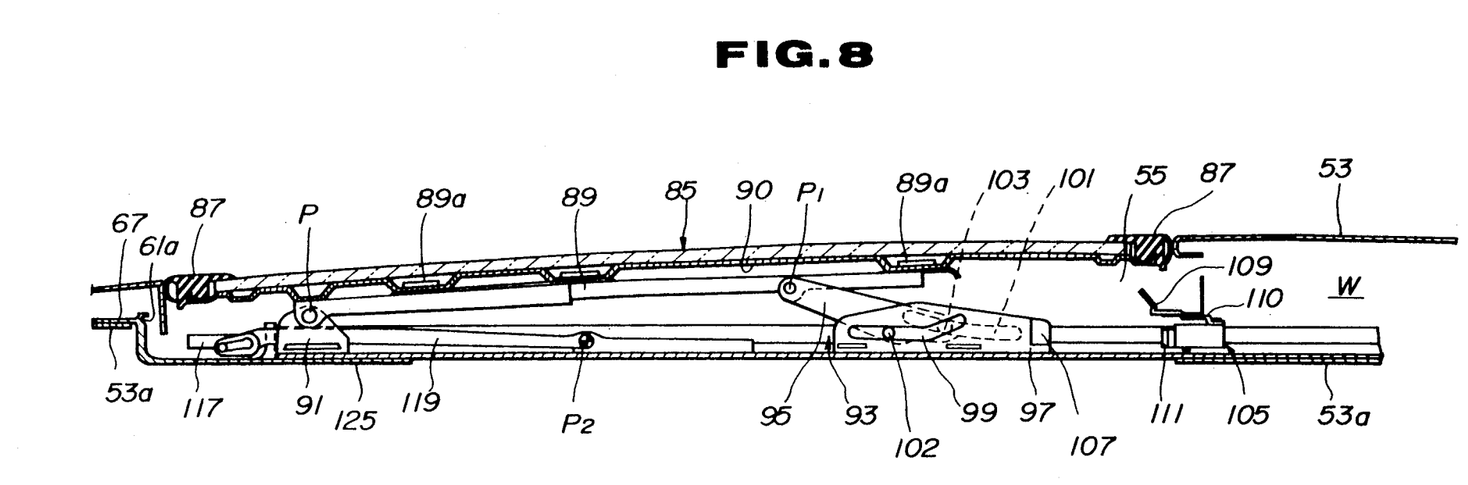
FIG. 8 is a vertically sectional view of the sun roof device of FIG. 7.

Referring to FIGS. 7 and 8, there is shown a sun roof device to which the lid guide structure 51 of the second embodiment is applied.

As is seen from FIG. 8, the vehicle roof 53 has the sun roof opening 55 formed therethrough. The lid 85 (which is transparent in the illustrated example) is associated with the sun roof opening 55 to close and open the same. A weather strip 87 is fixed to the periphery of the lid 85, which assures watertight sealing between the lid 85 and the peripheral portion of the sun roof opening 55 when the lid assumes a fully closed position as shown in FIG. 8.

A pair of base mounts 89 are secured by means of bolts 89a to a back plate 90 which is fixed to the back surface of the lid 85.

A lid operating mechanism is arranged between the base mounts 89 and the second and third elongate members 59 and 59.

The lid operating mechanism comprises two identical units which are respectively engaged with the guide rail portions 69 and 69 of the second and third elongate members 59 and 59. Thus, in the following, only one (viz., the right unit actually illustrated in FIG. 7) of the two units will be described for simplification of the description.

A front portion of the base mount 89 is pivotally connected through a pivot pin P to a front sliding shoe 91 which is slidably engaged with the guide grooves 69a and 69b of the afore-mentioned guide rail portion 69 (see FIG. 4) of the third elongate member 59.

A rear portion of the base mount 89 is mounted on a lifting mechanism 93. The lifting mechanism 93 comprises generally a lifting arm 95 which has an upper portion pivotally connected through a pivot pin $P_1$ to the rear portion of the base mount 89 and a rear sliding shoe 97 which is slidably engaged with the guide grooves 69a and 69b of the guide rail portion 69. The rear sliding shoe 97 has two spaced walls formed with respective guide slots 99 and 101. The lifting arm 95 has at its opposed major surfaces respective pins 102 and 103 slidably engaged with the guide slots 99 and 101 of the rear sliding shoe 97. As shown, the pin 102 is located between the pin $P_1$ and the pin 103. The guide slots 99 and 101 are so shaped and arranged that when the pins 102 and 103 move rearward, that is, rightward in FIG. 8, in their associated slots, the lifting arm 95 is tilted down thereby tilting down the lid 85 about the pin P of the front sliding shoe 91, while, when the pins 102 and 103 move forward, that is, leftward in FIG. 8, the lifting arm 95 is tilted up thereby tilting up the lid 85 about the pin P.

The rear sliding shoe 97 has at its rear end a projection 107 which is detachably engaged with a moving member 105.

The moving member 105 is slidably engaged with the guide grooves 69a and 69b of the guide rail portion 69. The moving member 105 carries thereon one end of a laterally extending gutter structure 109 through a bracket 110. It is to be noted that the gutter structure 109 is carried by the two moving members 105 of the two identical units of the lid operating mechanism. The moving member 105 has at its front end a catcher 111 which catches the projection 107 of the rear sliding shoe 97 when the lid 85 moves toward a lid container W arranged behind the sun roof opening 55.

As will be understood from FIG. 4, the guide rail portion 69 has a longitudinally extending cylindrical groove in which a driving cable 115 (see FIG. 7) is slidably received. The driving cable 115 is driven by an electric motor M which is of a reversible type. Although not shown in the drawings, a manual switch is mounted in a vehicle cabin for remotely controlling the motor M. The driving cable 115 has a portion fixed to the rear sliding shoe 97, so that the movement of the cable 115 induces a simultaneous movement of the shoe 97 along the guide rail portion 69.

Designated by numeral 117 in FIG. 8 is an air deflector which functions to deflect a head wind upward when raised. That is, the deflector 117 has both ends held by respective lift arms 119. These arms 119 are pivotally connected through pivot pins $P_2$ to the lid guide structure 51. Although not shown in the drawings, suitable springs are associated with the lift arms 119 to bias front portions of the arms 119 upward. When, as is shown in FIG. 8, the lid 85 assumes the fully closed position, the lift arms 119 are pressed down against the force of the biasing springs causing the deflector 117 to assume its retracted position.

In the following, operation of the sun roof device will be described.

For ease of understanding, the description will be commenced with respect to the fully closed position of the lid 85 as shown in FIG. 8.

When, upon energization of the electric motor M, the driving cable 116 is moved forward, the rear sliding shoe 97 is moved forward, that is, leftward in FIG. 8, the pins 102 and 103 of the lifting arm 95 are caused to slide rearward in the guide slots 99 and 101 of the rear sliding shoe 97. During this, the lifting arm 95 is gradually raised inducing a tilt-up position of the lid 85 wherein the lid 85 is tilted with its rear portion raised.

When then the driving cable 116 is moved rearward due to reversed operation of the motor M, the pins 102 and 103 of the lifting arm 95 are caused to slide forward in the guide slots 99 and 101. With this, the lifting arm 95 is gradually lowered inducing the fully closed position of the lid 85.

When the driving cable 116 is further moved rearward, the lifting arm 95 is further lowered and thus the lid 85 is lowered assuming a tilt-down positon wherein the rear end of the lid 85 is separated from the rear peripheral edge of the sun roof opening 55. Thus, thereafter, further rearward movement of the driving cable 116 induces a rearward movement of the lid 85 toward the lid container W. During the rearward movement of the lid 85, the projection 107 of the rear sliding shoe 97 is brought into abutment with the moving device 105 and moves the same toward the lid container W. When the lid 85 is fully contained in the lid container W, a switch (not shown) stops the energization of the motor M. With this, the sun roof opening 55 is fully opened.

The reversed movement of the lid 85 from the lid container W to the fully closed position is carried out with a reversed manner in which the parts of the lid operating mechanism are operated.

In the following, advantages of the second embodiment of the invention will be described.

First, since a process for bending the lid guide structure 51 is not needed, the disadvantages possessed by the afore-mentioned conventional lid guide structure 1001 of FIGS. 9 and 10 do not appear in this second embodiment.

Second, since the guide rail portion 69 along which each unit of the lid lifting mechanism is moved is provided in the separate elongate member 59, formation of a straight guide rail portion is easily achieved. In fact, in this second embodiment, the straight guide rail portion 69 extends throughout the entire length of the second (or third) elongate member 59. This means that each front sliding shoe 91 of the lid lifting mechanism can set the front end of the associated guide rail portion 69 as a frontmost possible position of the shoe 91. Thus, the portion of the lid 85 which is actually supported by the front sliding shoe 91 can be the front end or at least a portion near the front end of the lid 85. This increases the stability with which the lid 85 is supported by the front sliding shoe 91. This advantageous phenomenon will be more clarified when considering that, in the conventional lid guide structure 1001 provided by being bent, such a straight guide rail structure as the second embodiment is not obtained due to provision of the corner portion.

What is claimed is:

1. A lid guide structure for a sun roof device, comprising:
    a first elongate member;
    second and third elongate members extending in parallel from longitudinal ends of said first elongate member, respectively;
    wherein each of said second and third elongate members includes a longitudinally extending gutter portion which is defined between outboard and inboard walls,
    wherein mutually facing surfaces of said outboard and inboard walls are each formed at a major flat part thereof with a longitudinally extending channel leaving a longitudinally extending ridge at an upper end of the corresponding wall;
    wherein each of said longitudinally extending channels of the facing surfaces is defined by a first inclined surface positioned close to said longitudinally extending ridge and a second inclined surface positioned remote from said longitudinally extending ridge; and
    wherein an angle defined between a major part of said first inclined surface and said major flat part of the corresponding wall is greater than that defined between a major part of said second inclined surface and said major flat part of said corresponding wall.

2. A lid guide structure as claimed in claim 1, which said first elongate member includes a longitudinally extending gutter portion which is defined by front and rear walls, and in which at least one of mutually facing surfaces of said front and rear walls is formed at a major flat part thereof with a longitudinally extending channel leaving a longitudinally extending ridge at an upper end of the wall.

3. A lid guide structure as claimed in claim 2, in which a plastic corner piece is fixed to a junction portion at which each end of said first elongate member is connected to each of said second and third elongate members, said plastic corner piece being formed with a gutter portion by which said gutter portion of said first elongate member and said gutter portion of each of said second and third elongate members is connected.

4. A lid guide structure as claimed in claim 3, in which said plastic corner piece is fixed to said junction portion by means of caulking.

5. A lid guide structure as claimed in claim 4, in which said plastic corner piece is formed with a plurality of studs which are received and caulked in openings formed in said junction portion.

6. A lid guide structure as claimed in claim 5, in which each of said second and third elongate members includes further a rail guide portion which extends along said gutter portion, said rail guide portion including a pair of side walls one of which serves also as said inboard wall of said gutter portion.

7. A lid guide structure as claimed in claim 6, in which said first elongate member includes further a rail guide portion which extends along said gutter portion of the first elongate member, said rail guide portion including a pair of side walls one of which serves also as said rear wall of said gutter portion.

8. A lid guide structure as claimed in claim 7, in which said first, second and third elongate members are integrally connected to one another to form a generally U-shaped monolithic structure.

9. A lid guide structure as claimed in claim 8, in which said junction portion has a smoothly curved structure.

10. A lid guide structure as claimed in claim 6, in which said first, second and third elongate members are connected to one another by means of adhesive material at the junction portions to form a generally U-shaped structure.

11. A lid guide structure as claimed in claim 8, in which the inboard surface of said inboard wall of said gutter portion further has at the major flat part thereof another longitudinally extending channel.

12. A lid guide structure as claimed in claim 5, in which said plastic corner piece has a drain pipe whose interior is connected to the interior of the gutter portion of the corner piece.

13. A lid guide structure as claimed in claim 9, in which said plastic corner piece is arranged to cover a cut which is provided at an outboard part of said junction portion.

14. A lid guide structure as claimed in claim 13, in which said cut is provided by means of stamping.

15. A lid guide structure for a sun roof device, comprising:
   a first elongate member;
   second and third elongate members extending in parallel from longitudinal ends of said first elongate member, respectively;
   wherein each of said second and third elongate members includes a longitudinally extending gutter portion which is defined between outboard and inboard walls;
   wherein mutually facing surfaces of said outboard and inboard walls are each formed at a major flat part thereof with a longitudinally extending channel leaving a longitudinally extending ridge at an upper end of the corresponding wall;
   wherein said first elongate member includes a longitudinally extending gutter portion which is defined by front and rear walls, and in which at least one of mutually facing surfaces of said front and rear walls is formed at a major flat part thereof with a longitudinally extending channel leaving a longitudinally extending ridge at an upper end of the wall;
   wherein each of said longitudinally extending channels of all of said facing surfaces is defined by a first inclined surface positioned close to said longitudinally extending ridge and a second inclined surface positioned remote from said longitudinally extending ridge; and
   wherein an angle defined between said first inclined surface and said major flat part of the corresponding wall is greater than that defined between said second inclined surface and said major flat part of said corresponding wall.

* * * * *